United States Patent
Hummell et al.

(10) Patent No.: US 6,660,113 B2
(45) Date of Patent: Dec. 9, 2003

(54) METHOD FOR APPLYING A NON-CIRCULAR ADHESIVE LABEL TO A NON-CIRCULAR OPTICAL DISC

(75) Inventors: Michael Hummell, Newport Beach, CA (US); Joseph Sandor, Corona Del Mar, CA (US)

(73) Assignee: Avery Dennison Corporate Center, Pasadena, CA (US)

( * ) Notice: Subject to any disclaimer, the term of this patent is extended or adjusted under 35 U.S.C. 154(b) by 0 days.

(21) Appl. No.: 10/082,629

(22) Filed: Feb. 22, 2002

(65) Prior Publication Data

US 2002/0079059 A1 Jun. 27, 2002

Related U.S. Application Data

(62) Division of application No. 09/694,719, filed on Oct. 23, 2000.

(51) Int. Cl.[7] .............................. B65C 1/00; B65C 1/02
(52) U.S. Cl. .................. 156/60; 156/391; 156/556; 156/DIG. 1; 156/DIG. 2
(58) Field of Search .................. 156/391, 538, 156/556, 580, DIG. 1, DIG. 2, DIG. 37; 206/308.1, 307; D6/407, 626; D14/442, 422, 478, 60

(56) References Cited

U.S. PATENT DOCUMENTS

| | | | | |
|---|---|---|---|---|
| 5,732,979 A | * | 3/1998 | Finke et al. ................. 283/81 |
| 5,783,033 A | * | 7/1998 | Grossman ................... 156/556 |
| 5,882,555 A | * | 3/1999 | Rohde et al. ............... 264/1.33 |
| 5,951,819 A | * | 9/1999 | Hummell et al. ........... 156/556 |
| 5,982,736 A | * | 11/1999 | Pierson ...................... 369/273 |
| D418,502 S | * | 1/2000 | Friday ....................... D14/478 |
| D419,152 S | * | 1/2000 | Lowenstein ................ D14/478 |
| 6,315,021 B1 | * | 11/2001 | Lee et al. ................... 156/391 |
| 6,321,811 B1 | * | 11/2001 | Atkinson et al. ........... 156/391 |
| 6,321,814 B1 | * | 11/2001 | Tracy et al. ................ 156/556 |
| 6,347,654 B1 | * | 2/2002 | Koch .......................... 156/391 |
| 6,431,238 B1 | * | 8/2002 | Atkinson .................... 156/391 |
| 2002/0005255 A1 | * | 1/2002 | Leonardi ..................... 156/391 |
| 2002/0020504 A1 | * | 2/2002 | Kwang ....................... 156/582 |
| 2002/0162631 A1 | * | 11/2002 | Wien et al. ................. 156/391 |

FOREIGN PATENT DOCUMENTS

| | | | | |
|---|---|---|---|---|
| AU | 670909 B | * | 8/1996 | ............. B65C/1/02 |
| DE | 20005804 U1 | * | 10/2000 | ............. B65C/9/06 |
| DE | 19960801 A1 | * | 6/2001 | ............. B65C/1/02 |
| FR | 2763913 A1 | * | 12/1998 | ............. B65C/9/26 |

* cited by examiner

Primary Examiner—Richard Crispino
Assistant Examiner—Sue A. Purvis
(74) Attorney, Agent, or Firm—Walter A. Hackler

(57) ABSTRACT

A device for applying a non-circular adhesive label to a non-circular optical disc includes a base having an axial opening therein and a platform surrounding the opening for supporting the non-circular label. A plunger having a disc support element projects from the platform though the base axial opening and movable between a fist position supporting the disc above the platform and a second position enabling contact between the label and the disc. Arms are provided and attached to the plunger and movable therewith for contacting edges of the disc and aligning the disc with the label on the platform as the plunger is moved from the first to the second position.

12 Claims, 5 Drawing Sheets

METHOD FOR APPLYING A NON-CIRCULAR ADHESIVE LABEL TO A NON-CIRCULAR OPTICAL DISC

The present application is a division of U.S. patent application Ser. No. 09/694,719 filed on Oct. 23, 2000.

The present invention is generally related to devices for applying adhesive labels to optical discs, and more particularly, the invention pertains to a device for applying a non-circular adhesive label to a non-circular optical disc.

Electro-optical storage devices include laser disc, mini disc, CDE discs, DVD discs, CDs and CD-ROMs. These discs include a surface that is enabled for laser recording and reading of data from the disc. The process and technique for recording data onto a CD and for reading data from a CD are well known within the state of the art and not directly related to the present invention.

In mass production, many of these discs include a top surface with preprinted graphics, such graphics may be applied by silk screening or any suitable type printing process. Other types of discs utilize subsequent application of an adhesive label. Subsequent application of an adhesive label is most particularly useful for the production of customized discs.

In that regard, a number of non-circular optical discs are in use such as CD-recordable (CD-R) business cards and the like. These cards are shaped with generally straight parallel sides that are connected by rounded ends. The overall size of the CD business card is appropriate for accommodation within a wallet. Thus, a business CD-R provides a convenient compact medium for digital information such as, for example, curriculum vitae, brochures, portfolios or company information. The amount of data recordable on such discs is generally between about 20 megabytes and about 50 megabytes depending upon the physical dimensions of the disc.

Because each card is custom recorded, usually in relatively small numbers, the corresponding particulars of disc content must either be hand printed on the CD or fixed thereto through the use of a label. Such a label preferably corresponds in shape and size to the CD-R.

The adhesive label should be applied to the top surface of the disc in a manner maintaining proper overall balance of the disc. Since the discs are made from a lightweight plastic material and rotated at high RPM, a misapplied label can cause irregular rotation of the disc that can cause distortion of data read therefrom.

With non-circular cards such as the CD-R, hereinabove noted, the label should not only be applied to the CD-R in a coaxial manner, but should be correctly registered with the CD-R in the sense that the non circular perimeter of the disc and the label should be aligned. Any mis-registration or mis-alignment may require subsequent trimming of the label, which, in turn, may cause an imbalance.

Prior art devices for the application of circular labels on circular discs such as, for example, represented by U.S. Pat. Nos. 5,782,033, 5,925,205, 5,902,466 can not provide any registration of non-circular labels on non-circular discs.

SUMMARY OF THE INVENTION

The present invention provides for a device for applying a non-circular adhesive label to a non-circular optical disc with proper alignment and registration.

A device in accordance with the present invention for applying a non-circular adhesive to a non-circular discs generally includes a base having a axial opening therein and a platform surrounding the opening for supporting the non-circular label.

A plunger is provided which has a disc support element projecting from the platform through the base axial opening and moveable between the first position supporting the disc above the platform and a second position enabling contact between the label and the disc.

A first arm attached to the plunger and moveable therewith is provided for contacting a first edge of the disc and aligning the disc with the label on the platform as the plunger element is moved from the first position to the second position.

Preferably, a second arm is provided and attached to the plunger and movable therewith for contacting a second edge of the disc and aligning the disc with the label on the platform, as the plunger element is moved from the first to the second position. The second arm is preferably disposed at 180° from the first arm around the base opening.

In one embodiment of the present invention the disc support element includes keyed sides for aligning the label on the platform and another embodiment provides for ridges on the platform for aligning the label on the platform. The support element also includes a surface for rotatably supporting the disc before and during label application.

Each of the arms include a grip for engaging a discs side and rotating the disc as necessary to align the disc with the label on the platform as the plunger element is moved from the first to the second position. Preferably the arms include biasing elements for spreading the grips from one another as the plunger is moved from the second position to the first position. This separation enables optical discs of different sizes to be accommodated and oriented by the arms as the plunger is moved from the first to the second position.

Slots through the base are provided for receiving the first and second arms and causing convergence of the arms towards the discs supported above the label as the plunger is moved from the first to the second position. This movement is accomplished by pivotal attachment of each arm to the plunger at a point below the platform.

The grips each may include a straight surface for engaging first and second straight sides of the disc respectively and the device may further include a resilient member for urging the plunger from the second to the first position. This feature enables easy assembly of the label on the platform and disc on the plunger support element prior to application of the label and further allows easy application of the label to the disc by depression of the biasing element though manual pushing of the plunger from the first to the second position.

The biasing elements may comprise bendable members molded with each of the arms and the slots may have a width for causing compression the biasing elements toward the respective arms as the plunger is moved from the first position to the second position.

To finalize label application and to ensure a uniform adhesion between the label and the disc, a non-skid surface may be disposed on a bottom of the base for enabling the label to be manually smoothed against the disc after application thereto in order to ensure the uniform adhesion therebetween and a lock may be provided for releasably holding the plunger in the second position to facilitate handling and storage thereof.

Preferably the device is sized for the application of non-circular labels on to a CD business card.

Another embodiment of the present invention provides for an attachment device for use with an otherwise conventional circular adhesive label applicator in order to provide for applying a non-circular adhesive label to a non-circular optical disc.

In this instance, the circular adhesive label applicator includes a frame with a movable piston extending though a support surface whereas the attachment device includes a base for engaging the frame, and having an axial opening therein, with a platform surrounding the opening for supporting the non-circular label.

A plunger is provided for engaging the piston and includes a disc support element projecting from the platform through the base axial opening and movable with the piston between a first position supporting the disc above the platform and a second position enabling contact between the non-circular label and the non-circular discs. As hereinabove noted in connection with earlier disclosed embodiments, the support element may include a keyed surface for aligning the label with the platform or the platform may have ridges disposed thereon for aligning the label therewith.

A first arm attached to the plunger and movable therewith is provided for contacting a first edge of the non-circular disc and aligning the disc with the non-circular label on the platform as the plunger element is moved from the first position to the second position.

BRIEF DESCRIPTION OF THE DRAWINGS

The present invention will be more clearly understood with reference to the following detailed description when considered in conjunction with the accompanying drawings of which.

DETAILED DESCRIPTION

Figure 1:
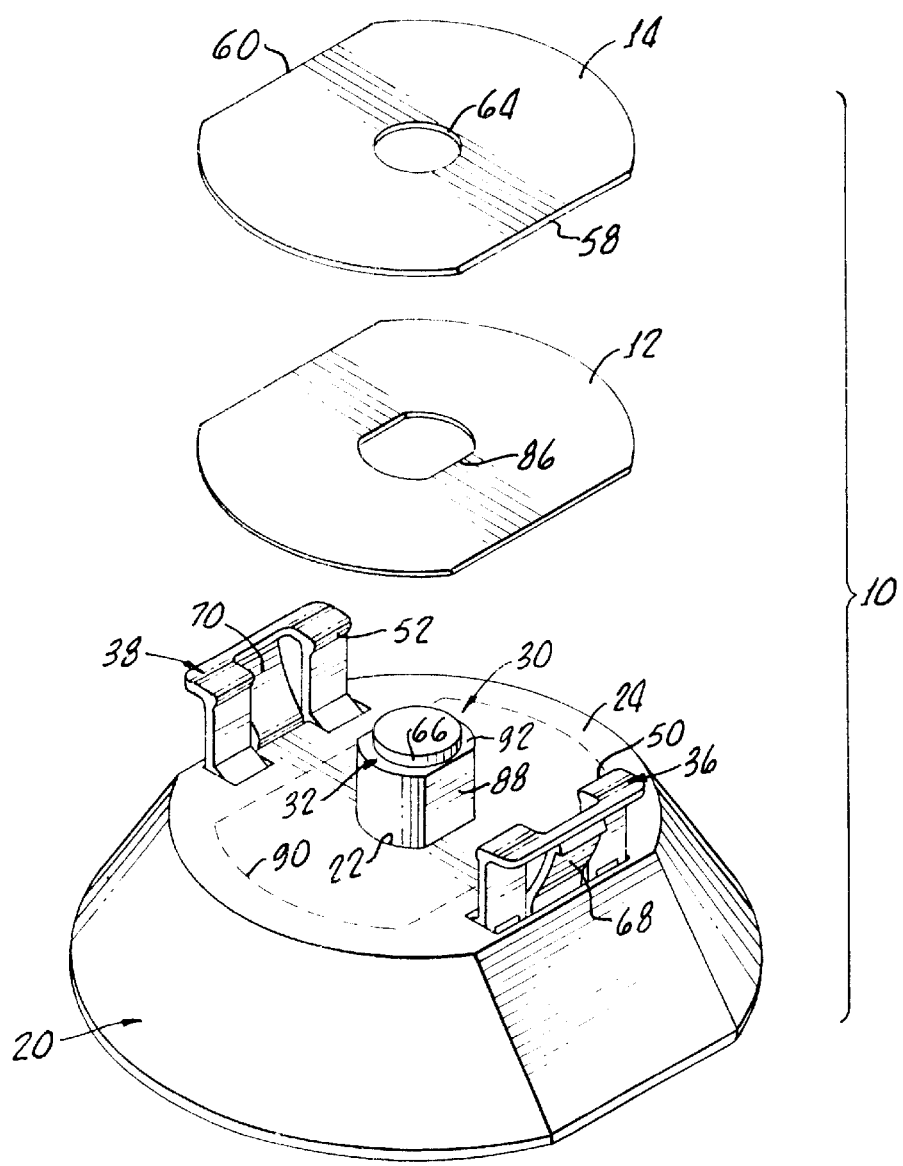
FIG. 1 is a perspective view of a device in accordance with the present invention for applying a non-circular adhesive label to a non-circular optical disc and generally showing a base, alignment arms, a platform for supporting a label and a plunger extending through the platform.
Figure 2:
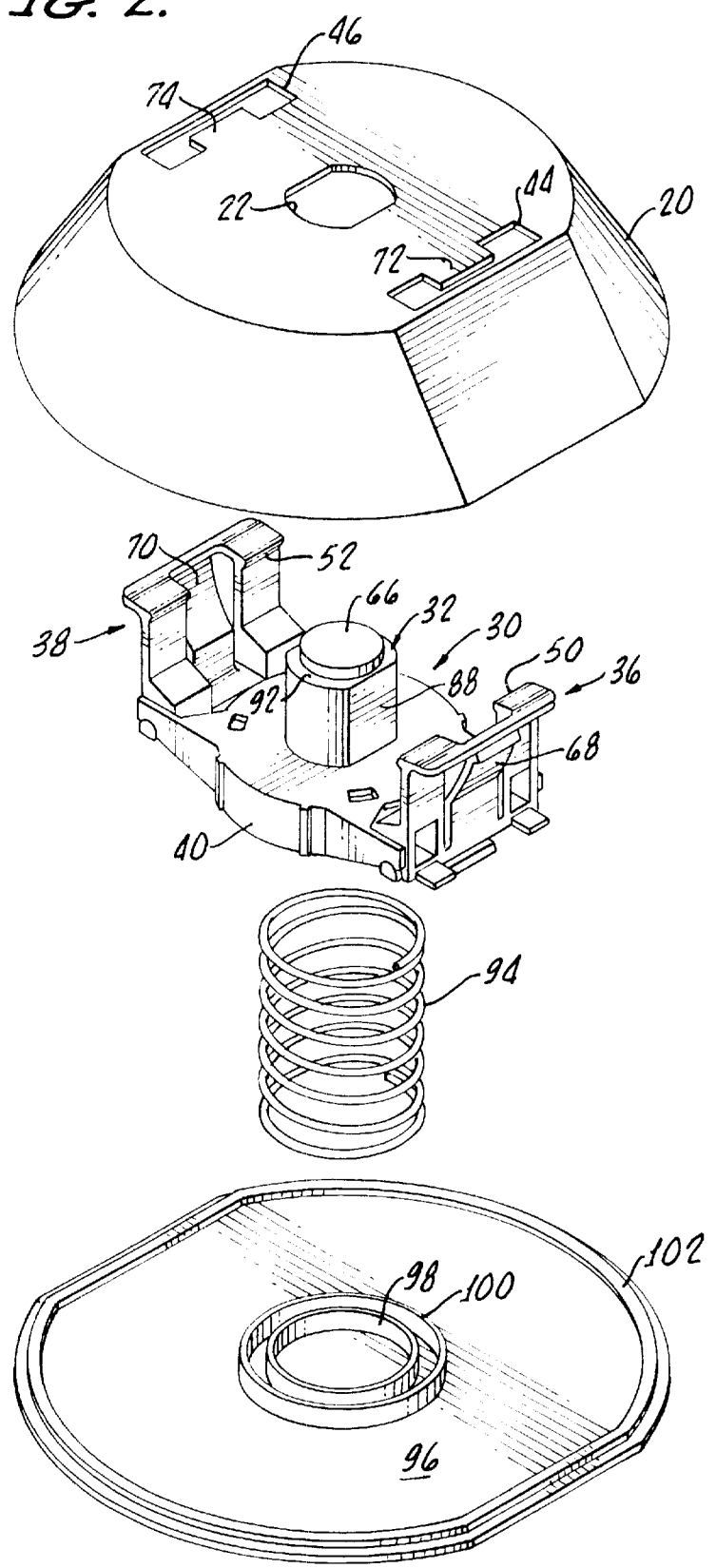
FIG. 2 is an exploded perspective view of the device shown in FIG. 1 more clearly showing the plunger, arms and a resilient member for urging the plunger into a first position as shown in FIG. 1.

With reference to FIG. 1 there is shown a device 10 for applying a non-circular adhesive label 12 to a non-circular optical disc 14 and which generally includes a base 20 having an axial opening 22 therein and a platform 24 surrounding the opening 22 for supporting the non-circular label 12. With further reference to FIGS. 2–6, the device 10 includes a plunger 30 having a disc support element 32 projecting from the platform 24 through the base axial opening 22, the plunger being movable between a first position supporting the disc 14 above the platform 24 (see FIGS. 1, 5 and 6) and a second position enabling contact between label 12 and the disc 14 (see FIGS. 3, 4).

First and second arms 36, 38 are pivotally attached to a plunger frame 40 and accordingly, are movable therewith as the plunger 30 is moved between the first and second positions. The arms 36, 38 extend through the base by way of slots 44, 46 and include grips 50, 52 for contacting first and second edges 58, 60 of the disc 14 and aligning the disc 14 with the label 12 on the platform 24 as the plunger is moved from the first position to the second position as hereinafter described in greater detail.

While two arms 36, 38 are illustrated, the device 10 is suitable for application of the label 12 to the disc 14 by a single arm 36 urging the disc 14 from the side 58 toward a disc opening 64 and against a hub edge 64 on the support element 32.

Each of the arms 36, 38 preferably include biasing elements 68, 70 for spreading the arms 36, 38, along with grips 50, 52 from one another as the plunger is moved from the second position to the first position, the biasing elements 68, 70 being urged by tabs 72, 74 disposed in the slots 44, 46 through the base 20.

Figure 5:
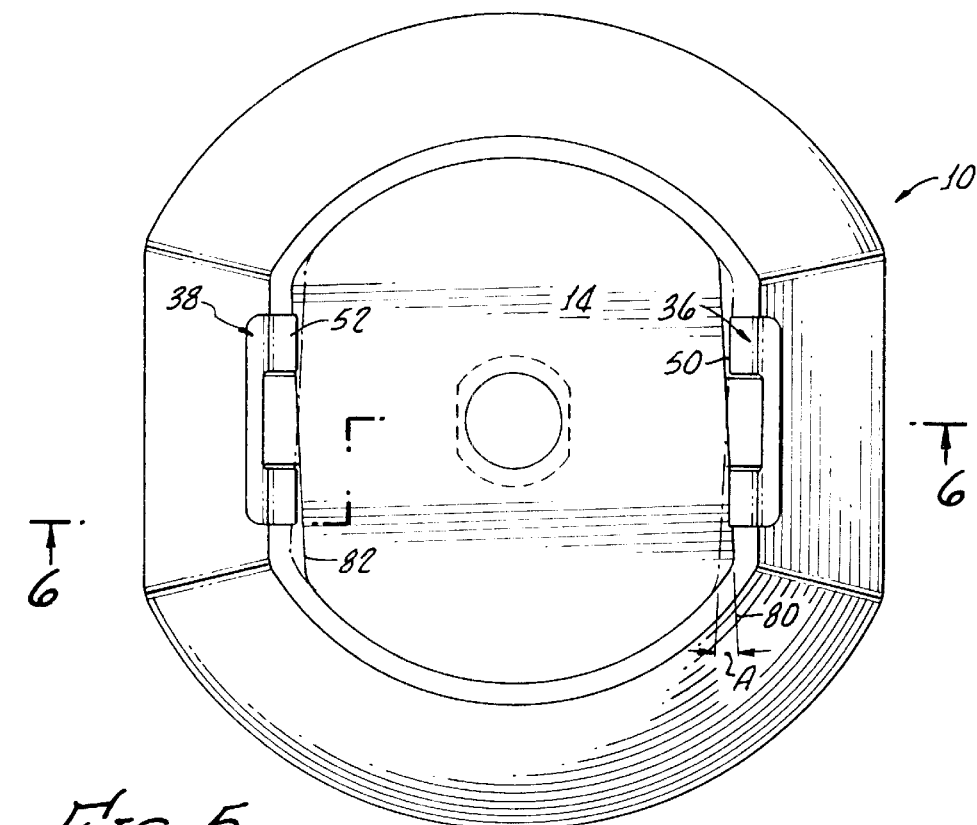
FIG. 5 is a top plan view of the device showing the arms in a spaced apart relationship for receiving non-circular cards of varying sizes.

As best shown in FIG. 5 with the arms 36, 38 in a spread position, cards of varying width may be accommodated by the device 10. Preferably the biasing elements 68, 70 are formed with the arms 36, 38 which may be preferably formed from, for example, a nylon material. Other elements of the present invention may be formed from any suitable plastic.

Figure 4:
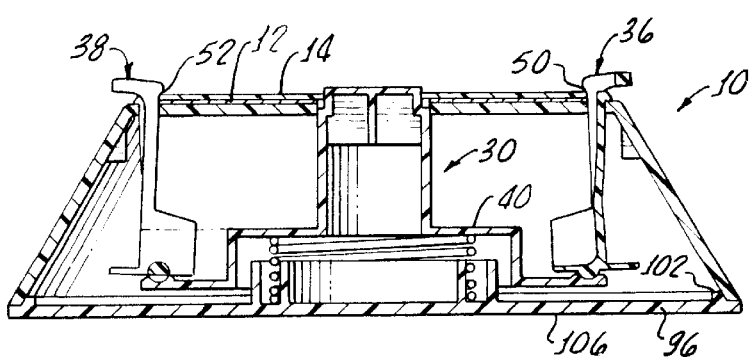
FIG. 4 is a cross-section view of the device shown in FIG. 3 taken along the line 4—4 and showing the plunger in a second position for enabling contact between the label and the platform.
Figure 6:
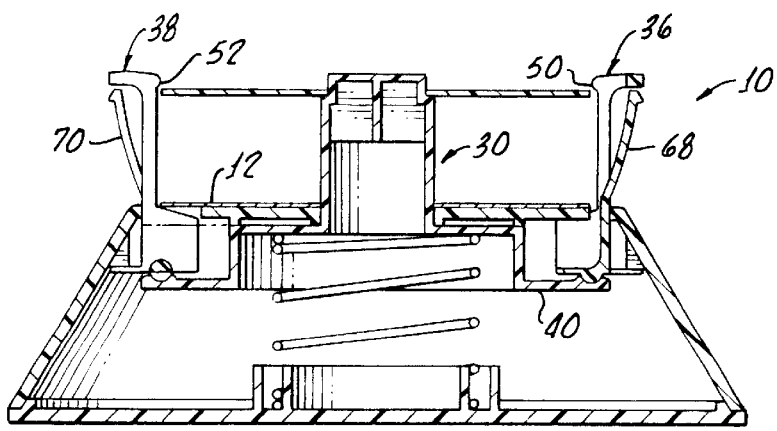
FIG. 6 is a cross-sectional view of the device shown in FIG. 5 taken along the line 6—6 and showing the plunger in the first position.

As the plunger 30 is moved from the first position shown in FIG. 6 to the second position shown in FIG. 4, the tabs 72, 74 urge the arms 36, 38 together via the biasing elements 68, 70. The grips 50, 52, which may include straight surfaces for engaging the sides 58, 60 of the disc 14, converge toward the misaligned disc as indicated by the extended lines 80, 82 and cause registration or alignment of the disc 14 with the label 12. The label may include a non-circular aperture 86 and be positioned on the platform 24 and aligned therewith by way of a non-circular aperture engaging sides 88 of the disc support element 32. Thus, the support element 32 provides for keyed engagement with the label 12 in order to align the label 12 on the platform 24.

Alternatively, the label 12 may be aligned on the platform 24 by a plurality of marks, guides or ridges 90 as indicated in dashed line in FIG. 1. In this instance the label may include a circular central aperture (not shown). The ridges 90 may be molded into the platform 24 or attached thereto in any conventional manner. Thus, various label 12 perimeters may be accommodated by various attached ridges 90.

Figure 3:
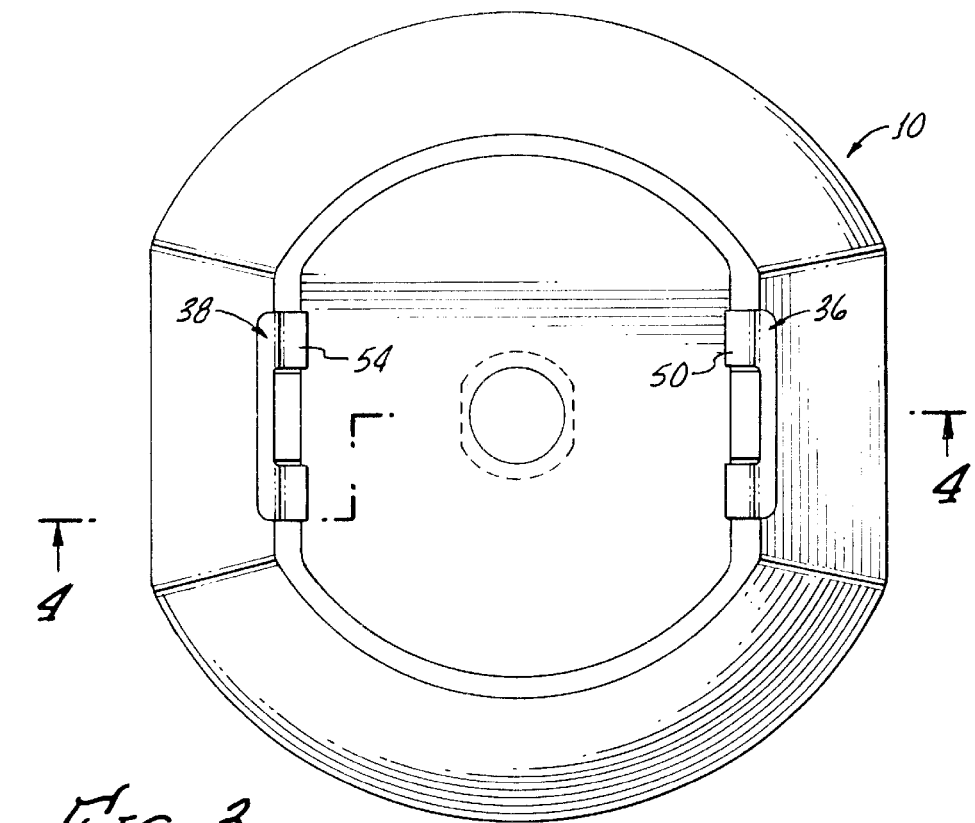
FIG. 3 is a top plan view of the device shown in FIG. 2 illustrating grips on the arms for engaging flat sides of a non-circular disc.

As shown in FIG. 5, the disc 14 is rotated by an angle A if necessary by the grips 50, 52 as the arms 36, 38 converge on the disc 14 and the grips 50, 52 approach one another. This effects a registration of the disc 14 with the label 12 as the plunger 30 is moved from the first position as shown in FIGS. 5 and 6 to the second position as shown in FIGS. 3 and 4. Rotation of the disc as the plunger 30 is moved from the first to the second position is enabled by a surface 92.

In order to maintain the plunger 30 in the first position to facilitate placement of the label 12 on the platform 24 and the disc 14 on the support element 32 a biasing element, for example, a spring 94 may be disposed between the plunger 30 and a bottom 96 of the base 20. Concentric rings 98, 100 molded into the bottom 96 provide for positioning the spring 94 beneath the plunger 30.

The bottom 96 may be fitted to the base 20 by way of a ridge 102 and the bottom 96 and base may be bonded to one another in any conventional manner.

In order to compactly store the devise 10, the arms may be releasably locked with the plunger in the second position as shown in FIG. 4 by the latches 72, 74. Other structure may also be used for this locking.

With reference to FIG. 4, the device 10 may include a non-skid, resilient surface 106 disposed on the bottom 96 that enables the label 12 to be manually smoothed against the disc 14 after application thereto, in order to ensure uniform adhesion therebetween. In this operation, the device 10 is inverted and the disc 14, with label 12 applied thereto, is disposed on the surface 106 and gentle smoothing pressure is applied thereon. Thus, the device 10 not only enables registered application of the label 12 to the disc 14, but also by way of the surface 106, enables a smooth professional uniform adhesion contact between the disc 14 and label 12.

As shown in FIGS. 1–6, the device 10 is shown illustrating the application of the label 12 to a CD business card, however, other shaped discs may be accommodated by the device 10 and should be considered as encompassed in the teachings of the invention.

Figure 7:
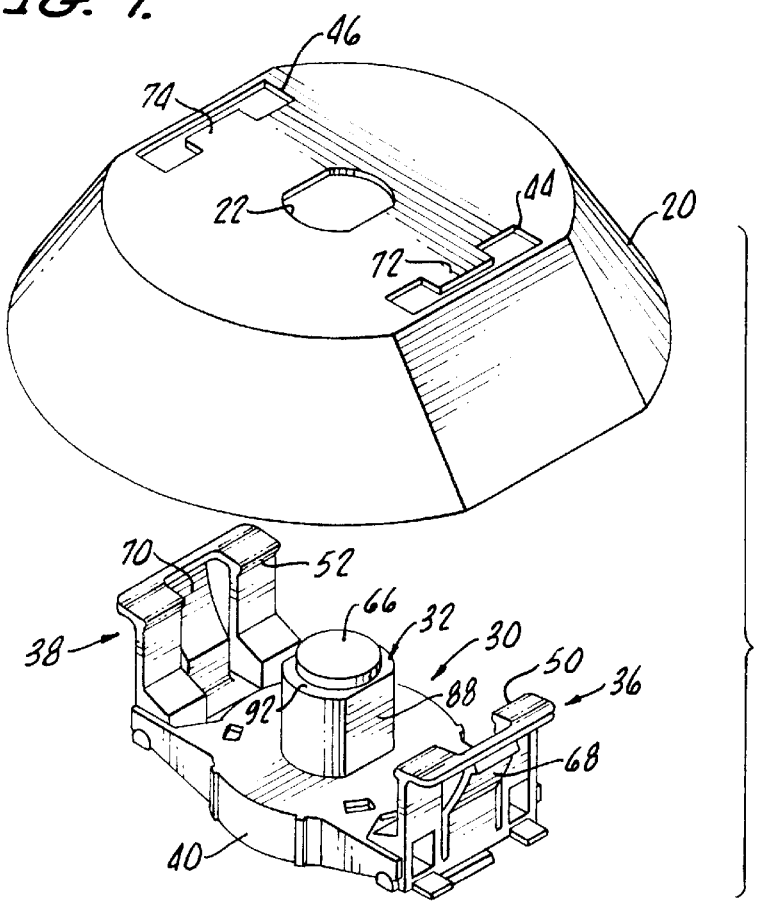
FIG. 7 is an alternate embodiment of the present invention for use as an attachment to a prior art circular adhesive label applicator, the embodiment including a base, plunger and arms as hereinabove noted.

With reference to FIG. 7, there is shown an alternative embodiment 110 in accordance with the present invention. Identical or substantially similar components are indicated by common reference characters as hereinbefore described in connection with the device 10.

Figure 8:
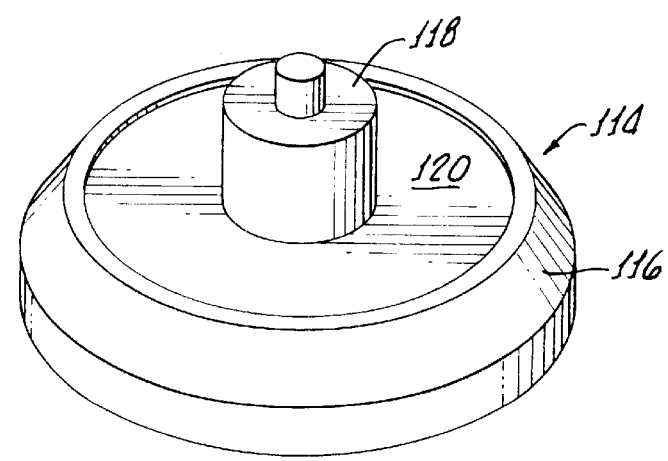
FIG. 8 is a perspective view of a circular adhesive label applicator that may be utilized with the embodiment shown in FIG. 7 for operating the plunger.

The embodiment 110 is an attachment device for use with a prior art circular label applicator 114 as illustrated in FIG. 8. The prior art applicator 114 may be, for example, as set forth in U.S. Pat. No. 5,951,819 to Hummell and Pearce and includes a frame 116 with a moveable piston 118 extending through a support surface 120.

In operation, the device 110 is disposed onto the prior art applicator 114 with the piston 118 engaging the plunger 30 for urging the plunger to the first position as hereinabove described. A spring (not shown) loading the piston enables depression of the plunger against the piston 118.

While the plunger 30 is moveable within the base 20, it is prevented from separation therefrom by the biasing elements 68, 70 and the size of the slot 44, 46. Thus, the attachment 110 may be removed and disposed on the prior art labeler 114 in one piece in order to convert the circular label applicator 114 to a non-circular applicator.

A method in accordance with the present invention for applying a non-circular adhesive label to a non-circular optical disc includes supporting the label 12 on the platform 24 and supporting the non-circular disc 14 on the plunger element 32 and therefore aligning the disc 14 with the label 12 as the plunger 30 is moved from the first position to the second position.

Although there has been described hereinabove a device and attachment for applying non-circular adhesive labels to non-circular optical discs in accordance with the present invention for the purpose of illustrating the manner in which the invention may be used to advantage, it will be appreciated that the invention is not limited thereto. Accordingly, any and all modification, variations, or equivalent arrangements which may occur to those skilled in the art should be considered to be within the scope of the invention as defined in the appended claims.

What is claimed is:

1. A method for applying a non-circular adhesive label to a non-circular optical disc, said method comprising:

supporting a non-circular label on a base platform, the base having an axial opening therein surrounded by the platform;

supporting a non-circular disc on a plunger element projecting from the platform through the base axial opening;

moving said plunger element between a first position supporting the disc above the platform and a second position enabling contact between the label and the disc; and aligning the disc with the label on the platform by an arm originally disposed in a spaced apart relationship with the disc and approaching the disc as the plunger element is moved from the first position to the second position.

2. The method according to claim 1 wherein the step of aligning the disc with the arm includes engaging at least one side of the disc as the plunger is moved from the first to the second position.

3. The method according to claim 2 wherein the step of aligning the disc includes using two arms originally disposed in a spaced apart relationship with the disc approaching and engaging two flat sides of the disc as the plunger is moved from the first to the second position.

4. The method according to claim 3 further comprising the step of aligning the label on the platform with a keying surface on said plunger element.

5. The method according to claims 3 further comprising the step of aligning the label on the platform with guides disposed on the platform.

6. A method for applying a non-circular adhesive label to a non-circular optical disc, said method comprising:

supporting a non-circular label;

supporting a non-circular disc on a plunger element;

moving said plunger element between a first position supporting the disc in a spaced apart relationship with the label and a second position enabling contact between the label and the disc; and aligning the disc with the label by an arm originally disposed in a spaced apart relationship with the disc and approaching the disc as the plunger element is moved from the first position to the second position.

7. The method according to claim 6 wherein the step of aligning the disc with the arm includes engaging at least one side of the disc as the plunger is moved from the first to the second position.

8. The method to claim 7 wherein the step of aligning the disc includes using two arms originally disposed in a spaced apart relationship with the disc approaching and engaging two flat sides of the disc as the plunger is moved from the first to the second position.

9. The method according to claim 8 further comprising the step of aligning the label on a platform with a keying surface on said plunger element.

10. The method according to claims 8 further comprising the step of aligning the label on a platform with guides disposed on the platform.

11. A method for applying a non-circular adhesive label to a non-circular optical disc, said method comprising:

moving a disc support between a first position supporting the disc in a spaced apart relationship with the label and a second position enabling contact between the label and the disc;

moving an arm with said disc support, for contacting the disc and aligning the disc with the label as the disc is moved from the first position to the second position; and said arm being disposed in a spaced apart relationship with the disc in the first position and approaching the disc until contact herewith as the disc is moved from the first position to the second position.

12. A method for applying a CD business card adhesive label to CD business card, said method comprising:

moving a card support between a first position supporting the card in a spaced apart relationship with the label and a second position enabling contact between the label and the card;

moving a pair of arms with said card support, for contacting the card and aligning the card with the label as the card is moved from the first position to the second position; and said arms being disposed in a spaced apart relationship with the card in the first position and approaching the card until contact herewith as the card is moved from the first position to the second position.

* * * * *